(12) United States Patent
Wu

(10) Patent No.: US 11,498,265 B2
(45) Date of Patent: Nov. 15, 2022

(54) APPARATUS AND METHOD FOR THREE-DIMENSIONAL PRINTING

(71) Applicant: Young Optics Inc., Hsinchu (TW)

(72) Inventor: Li-Han Wu, Hsinchu County (TW)

(73) Assignee: Young Optics Inc., Hsinchu (TW)

( * ) Notice: Subject to any disclaimer, the term of this patent is extended or adjusted under 35 U.S.C. 154(b) by 991 days.

(21) Appl. No.: 15/014,811

(22) Filed: Feb. 3, 2016

(65) Prior Publication Data
US 2017/0217052 A1    Aug. 3, 2017

(51) Int. Cl.
| | |
|---|---|
| *B29C 64/124* | (2017.01) |
| *B33Y 10/00* | (2015.01) |
| *B33Y 30/00* | (2015.01) |
| *B29C 64/255* | (2017.01) |
| *B29C 33/68* | (2006.01) |
| *B29K 483/00* | (2006.01) |
| *B29K 427/18* | (2006.01) |

(52) U.S. Cl.
CPC ............ *B29C 64/124* (2017.08); *B29C 33/68* (2013.01); *B29C 64/255* (2017.08); *B33Y 10/00* (2014.12); *B33Y 30/00* (2014.12); *B29K 2427/18* (2013.01); *B29K 2483/00* (2013.01); *B29K 2995/0018* (2013.01); *B29K 2995/0026* (2013.01)

(58) Field of Classification Search
CPC ....... B33Y 30/00; B33Y 10/00; B29C 64/255; B29C 64/124; B29C 33/68; B29K 2483/00; B29K 2995/0026; B29K 2427/18; B29K 2995/0018
See application file for complete search history.

(56) References Cited

U.S. PATENT DOCUMENTS

| | | | |
|---|---|---|---|
| 5,192,559 A | 3/1993 | Hull et al. | |
| 7,195,472 B2 | 3/2007 | John | |
| 7,438,846 B2 | 10/2008 | John | |
| 2013/0292862 A1* | 11/2013 | Joyce | ................. B29C 67/0096 264/40.1 |
| 2014/0191442 A1* | 7/2014 | Elsey | ..................... B33Y 10/00 264/401 |
| 2018/0029296 A1* | 2/2018 | Van Esbroeck | ........ B33Y 10/00 |

FOREIGN PATENT DOCUMENTS

JP            06-246838 A    *    9/1994   ............. G01L 3/101

OTHER PUBLICATIONS

Machine translation of JP06-246838A (Year: 1994).*

* cited by examiner

*Primary Examiner* — Leith S Shafi

(57) ABSTRACT

A three-dimensional printing apparatus includes a liquid tank. The liquid tank includes a release layer and a plate. The release layer has a workpiece curing area, and the plate supports the release layer and has a first area corresponding to the workpiece curing area and a second area adjacent to the first area; the second area has at least one fluid passage extending from a first surface of the plate contacting the release layer to a second surface of the plate. The embodiments of the present invention facilitate the separation of workpieces from the release layer. Another three-dimensional printing apparatus and a three-dimensional printing method are also provided.

18 Claims, 7 Drawing Sheets

APPARATUS AND METHOD FOR THREE-DIMENSIONAL PRINTING

FIELD OF THE INVENTION

The present invention relates to a printing apparatus, and more particularly to an apparatus and method for three-dimensional printing.

BACKGROUND OF THE INVENTION

In conventional light curing three-dimensional printing devices, a release layer and a plate for supporting the release layer are disposed on the bottom of a tank for accommodating photosensitive resins. In printing of a workpiece, the photosensitive resins would be cured to form a layer of the workpiece and attach to the release layer. To initiate printing of the following layer, applying a force to lift up the workpiece is required to separate the workpiece from the release layer and allow uncured photosensitive resins to fill between the workpiece and the release layer. However, in conventional three-dimensional printing devices, the space between the release layer and the plate becomes airtight during printing of a workpiece and low-pressure vacuum builds up therewithin during releasing of the resulting workpiece, therefore causing difficulties in separating the workpiece from the release layer.

While increasing the uplift force may be helpful in separating the workpiece from the release layer, application of strong uplift forces often leads to damage of the workpiece and deformation of the release layer.

BRIEF SUMMARY OF THE INVENTION

An embodiment of the present invention provides a three-dimensional printing apparatus for facilitating the separation of workpieces from the release layer.

A three-dimensional printing apparatus according to an embodiment of the present invention includes a liquid tank, a light source device, and a curing platform. The liquid tank is configured for accommodating a photosensitive liquid. The liquid tank includes a release layer and a plate. The release layer has a workpiece curing area; the plate supports the release layer and has a first area corresponding to the workpiece curing area and a second area adjacent to the first area; and the second area has at least one fluid passage extending from a surface of the plate contacting the release layer to another surface of the plate. The light source device is disposed below the liquid tank for providing an curing light beam passing through the plate and irradiating the workpiece curing area. The curing platform and the plate are disposed on two opposite sides of the release layer of the liquid tank, and the curing platform is configured to move toward and away from the release layer.

An embodiment of the present invention utilizes the fluid passage(s) disposed on the plate or the lifting device(s) for lifting the release layer to balance the pressure along the two sides of the release layer, thus eliminating the low-pressure vacuum built between the release layer and the plate. An embodiment of the present invention facilitates the separation of workpieces from the release layer, avoiding workpiece damages and release layer deformation, as well as improving the speed and stability of three-dimensional printing.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
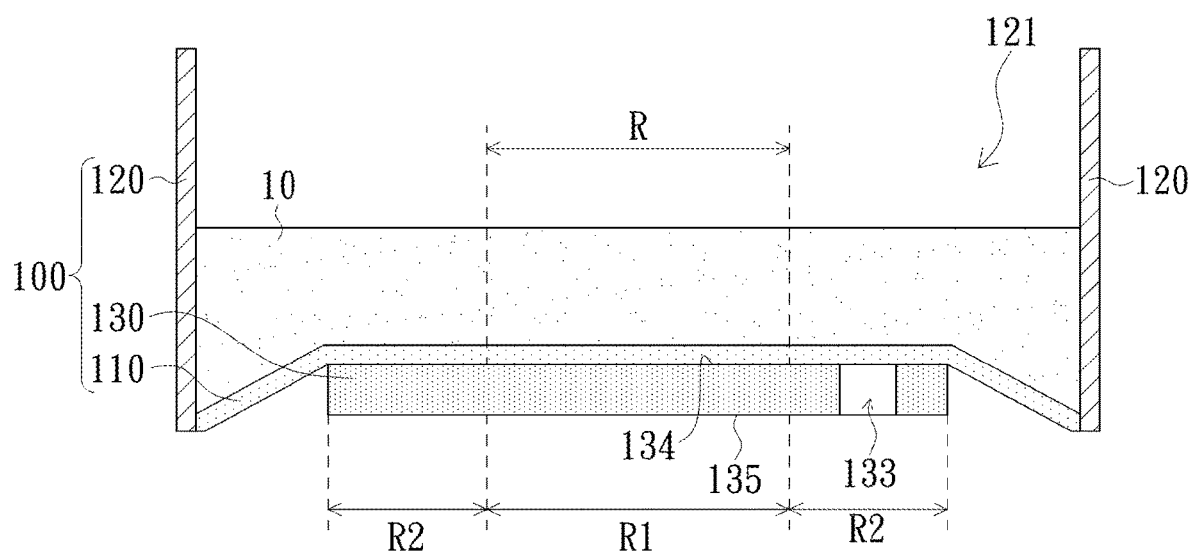
FIG. 1 is a schematic illustration of a liquid tank according to an embodiment of the present invention.

Referring now to FIG. 1. A liquid tank 100 of the present embodiment is applicable to a three-dimensional printing apparatus, and is configured to accommodate a photosensitive liquid 10. The liquid tank 100 includes a release layer 110 and a plate 130. The release layer has a workpiece curing area R, onto which an curing light beam provided by the three-dimensional printing apparatus irradiates. The plate 130 supports the release layer 110, and has a first area R1 corresponding to the workpiece curing area R and a second area R2 adjacent to the first area R1. The second area R2 has at least one fluid passage 133 extending from a surface 134 of the plate 130 contacting the release layer 110 to another surface of the plate 130; for example, a surface 135 opposite to the surface 134. In another embodiment of the present invention, the fluid passage 133 is located in the first area R1.

The liquid tank 100 may include a plurality of side walls 120 surrounding the release layer 110. An accommodating space 121 is formed between the side walls 120 and the release layer 110 for accommodating the photosensitive liquid 10. Additionally, the release layer 110 is a flexible film made of soft materials, and is light transmissive. The release layer 110 may also be weakly adhesive to surfaces; more specifically, the release layer 110 may, but is not limited to, be made of silicone or polytetrafluoroethylene.

The second area R2 of the plate 130 surrounds the first area R1. In another embodiment, the second area R2 may be disposed on a side of the first area R1. Moreover, the second area R2 includes one fluid passage 133; in other embodiments, the second area R2 may include a plurality of fluid passages 133. Furthermore, the plate 130 may be made of glass, plastics, acrylates, or other materials capable of providing sufficient support. The plate 130 may also be light transmissive. The fluid passage 133 linearly extends from the surface 134 of the plate 130 to the surface 135 opposite to the surface 134.

Figure 2A:
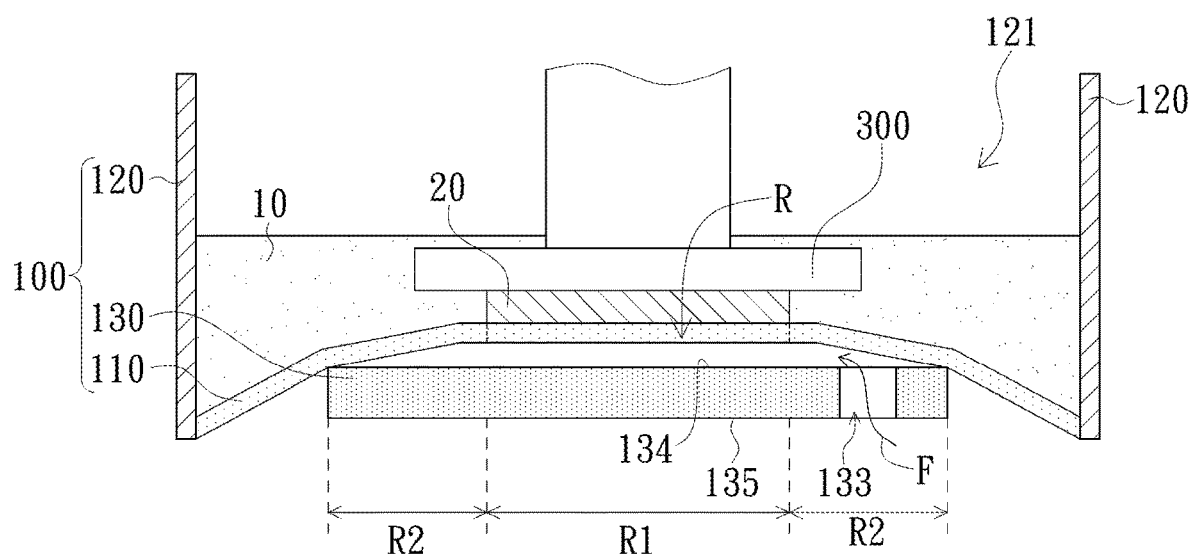
FIG. 2A is a schematic illustration of a workpiece separating from a release layer of the liquid tank of FIG. 1.

Referring now to FIG. 2A. The photosensitive liquid 10 is cured in the workpiece curing area R1 to form a workpiece 20 attached to a curing platform 300 of the three-dimensional printing apparatus. Thereafter, uplift of the workpiece 20 by the curing platform 300 allows fluid F to flow through the fluid passage 133 and enter the space between the release layer 110 and the surface 134 of the plate 130, therefore eliminating low-pressure vacuum built up between the release layer 110 and the plate 130 and balancing the pressure along the two sides of the release layer 110. The workpiece 20 may be easily separated from the release layer 110 by applying an uplift force that is greater than only the adhesive force between workpiece 20 and the release layer 110, allowing the photosensitive liquid 10 to fill between the workpiece 20 and the release layer 110 so as to initiate printing of the following layer. Consequently, the liquid tank 100 of the present embodiment greatly reduces the uplift force required to separate the workpiece 20 from the release layer 100, and thus damage of the workpiece 20 or deformation of the release layer 100 can be avoided.

Figure 2B:
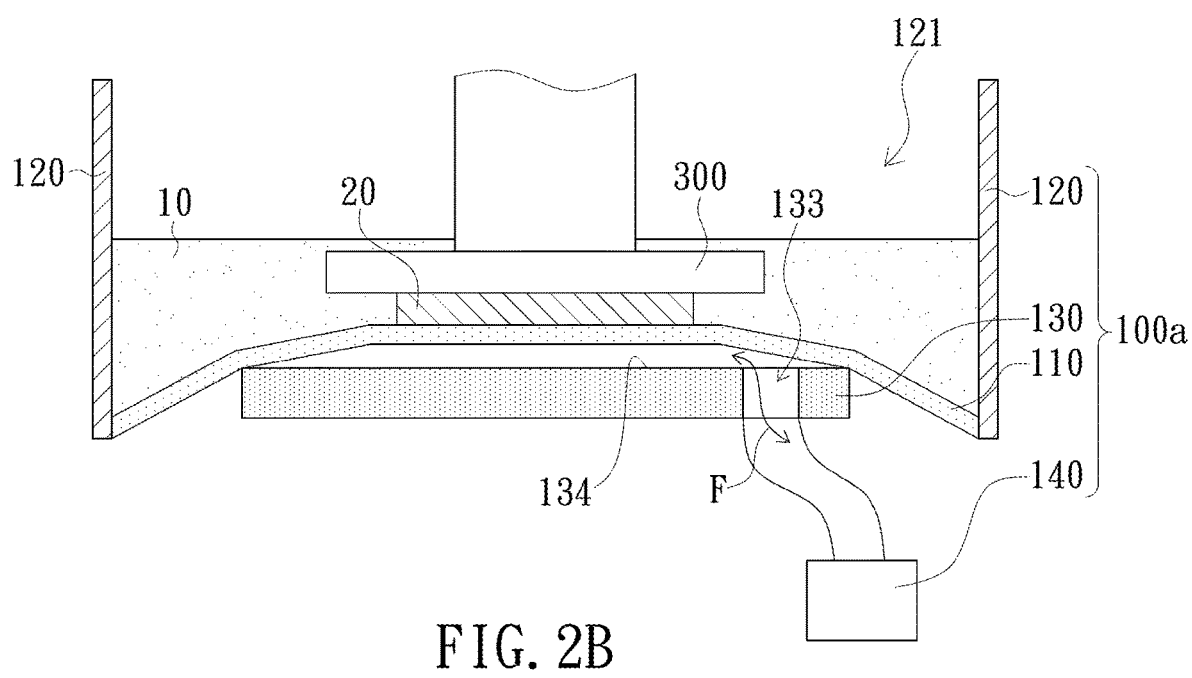
FIG. 2B is a schematic illustration of a workpiece separating from a release layer of a liquid tank according to another embodiment of the present invention.

Referring now to FIG. 2B. In another embodiment, the liquid tank 100a further includes a fluid driver 140 connecting to the fluid passage 133 for driving the fluid F to flow through the fluid passage 133. More specifically, after formation of each layer of the workpiece 20, fluid driver 140 would drive the fluid F to flow through the fluid passage 133 and enter the space between the release layer 110 and the surface 134 of the plate 130; in this way, low-pressure vacuum built up between the release layer 110 and the plate 130 is eliminated and pressure along the two sides of the release layer 110 is balanced, therefore facilitating the separation of workpiece 20 from the release layer 110. Thereafter, the fluid driver 140 would clear the fluid F out from the space between the release layer 110 and the surface 134 of the plate 130 via the fluid passage 133, allowing the release layer 140 to sit smoothly over the plate 130 and ensuring precision of the following printings by preventing residual fluid F to remain between the release layer 110 and the surface 134 of the plate 130. The fluid F may be gas, such as air, nitrogen, or other types of gas commonly used in manufacturing and processing. The fluid F may also be liquid, such as water.

Figure 3A:
FIGS. 3A and 3B are schematic illustrations of plates according to yet another two embodiments of the present invention.
Figure 3B:
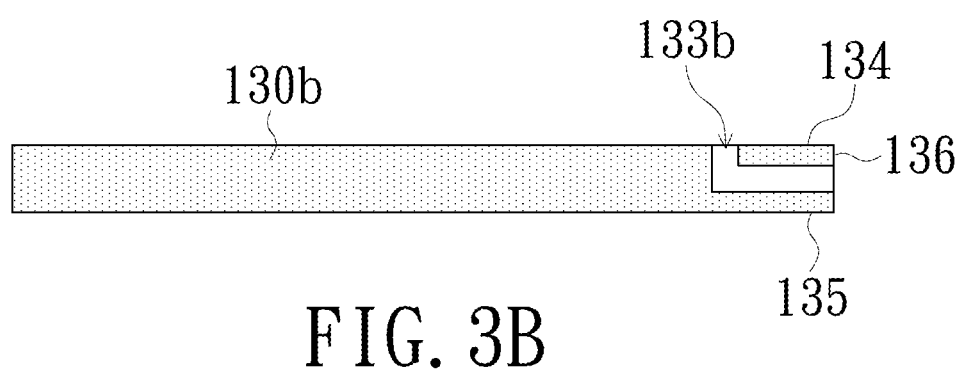

In other embodiments as illustrated in FIGS. 3A and 3B, a fluid passage 133a may non-linearly or meanderingly extend from the surface 134 of the plate 130a to the surface 135 opposite to the surface 134. a fluid passage 133b may also extend from the surface 134 of the plate 130b to the surface 136 adjacent to the surface 134.

Figure 4:
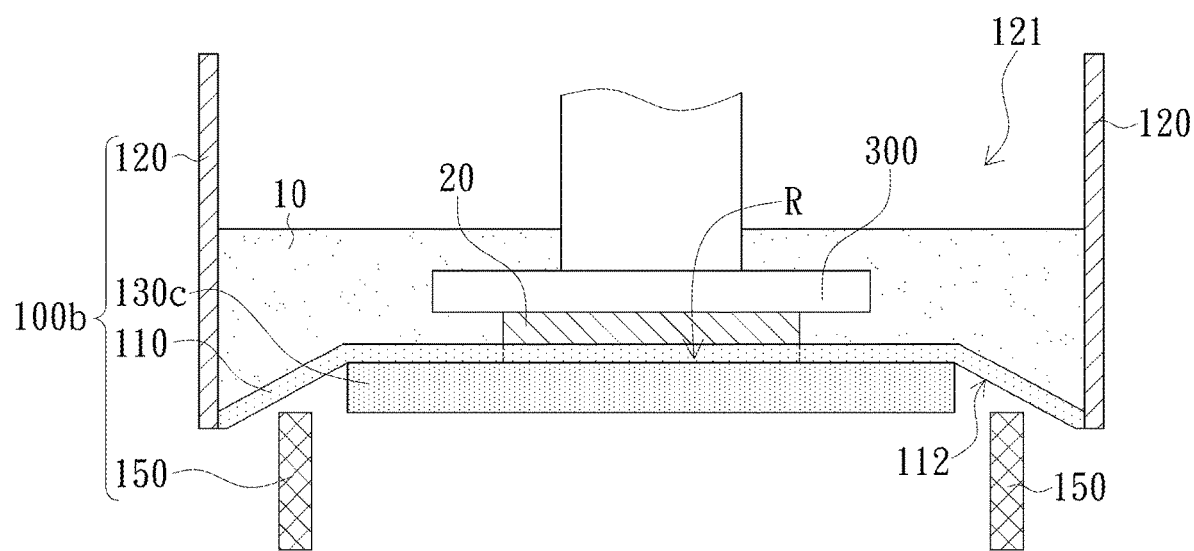
FIG. 4 is a schematic illustration of a liquid tank according to another embodiment of the present invention.

Referring now to FIG. 4. Another embodiment of the present invention provides a liquid tank 100b applicable to a three-dimensional printing apparatus. The liquid tank 100b is configured for accommodating a photosensitive liquid 10, and includes a release layer 110, a plate 130c, and at least one lifting device 150. The liquid tank 100b may further include a plurality of side walls 120. The release layer 110 and the side walls of the present embodiment are structurally similar to those of the aforementioned embodiments; redundant details thereof are thus not repeatedly provided herein. The liquid tank 100b of the present embodiment is different from the liquid tank 100 of the aforementioned embodiments mainly in that the plate 130c supporting the surface 112 of the release layer 110 does not include a fluid passage and that the at least one lifting device 150 is disposed adjacent to the plate 130c and props against the surface 112. The at least one lifting device 150 is configured for lifting the release layer 110 so as to separate at least a portion of the release layer 110 from the plate 130c.

Taking the embodiment illustrated in FIG. 4 for example, two lifting devices 150 may be symmetrically disposed on two sides of the plate 130c. In other embodiments, one lifting device 150 may be disposed on one side of the plate 130c (not shown in figure), or a plurality of lifting devices 150 may surround or encircling around the plate 130c (not shown in figure); the present invention is not limited thereto however.

Figure 5:
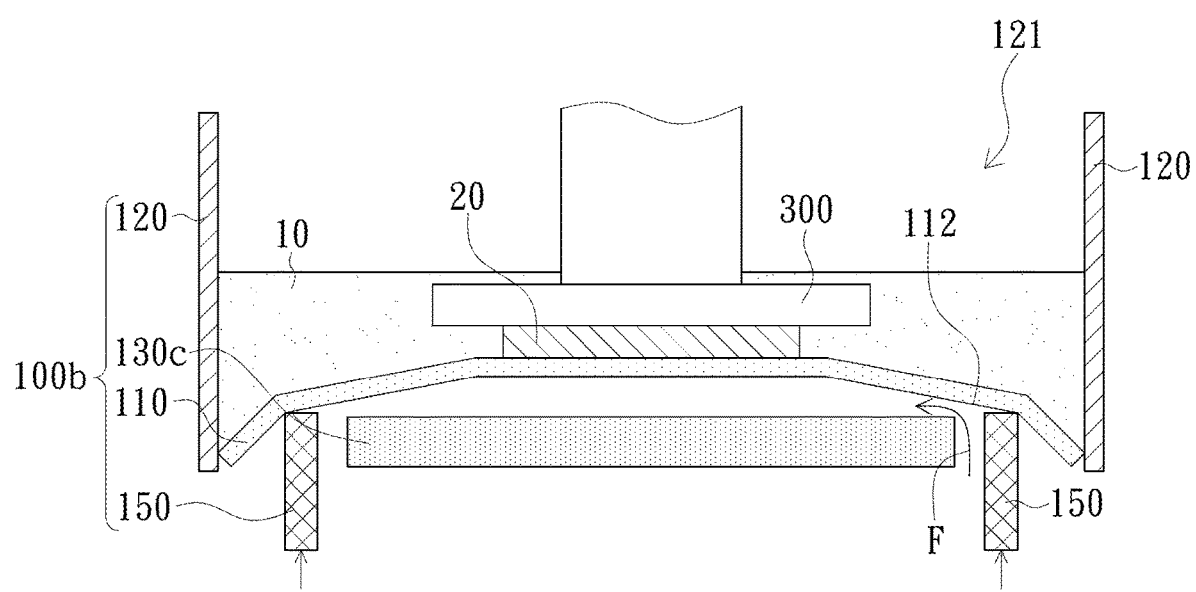
FIG. 5 is a schematic illustration of the actuation of the embodiment according to FIG. 4.

Referring now to FIG. 5. After the photosensitive liquid 10 is cured to form a workpiece 20, the lifting device 150 shifts upward and lifts the release layer 110 by propping against the surface 112, therefore separating the release layer 110 from the plate 130c and allowing the fluid F to enter the space between plate 130c and surface 112 of the release layer 110. Consequently, low-pressure vacuum built up between the release layer 110 and the plate 130c is eliminated and pressure along the two sides of the release layer 110 is balanced, thus effectively reducing the uplift force required to separate the workpiece 20 and the release layer 110 and preventing damage of the workpiece 20 or deformation of the release layer 100. Furthermore, the lifting device 150 may be adopted in any of the aforementioned embodiments in which at least one liquid passage is present in the plate.

Figure 6:
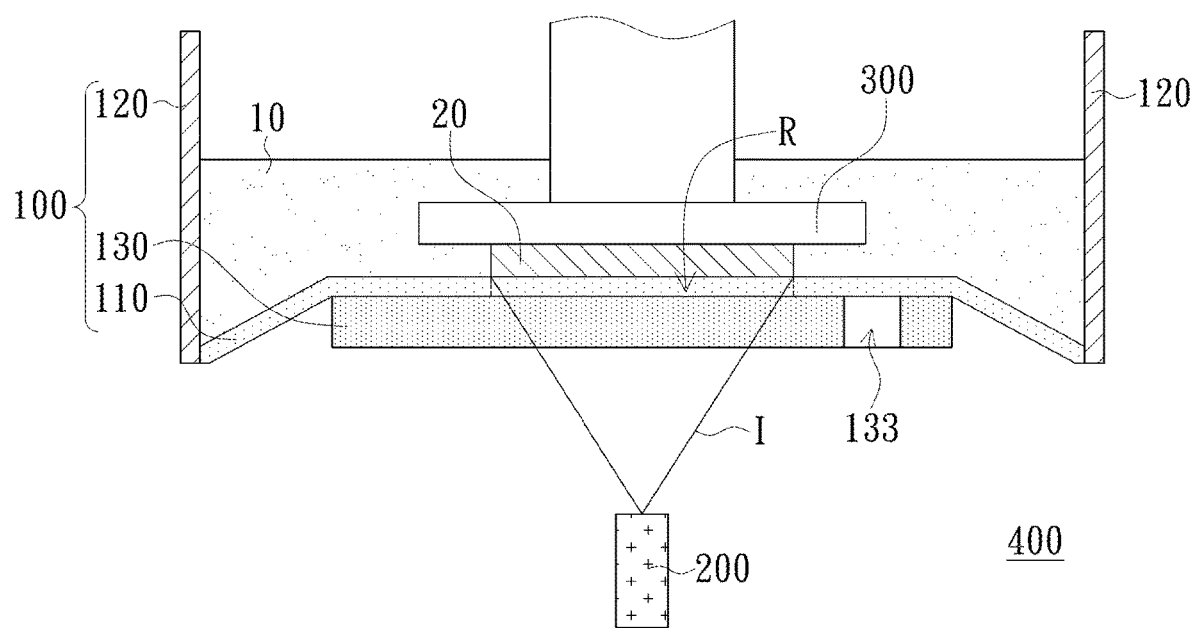
FIG. 6 is a schematic illustration of a three-dimensional printing apparatus according to an embodiment of the present invention.

Referring now to FIG. 6. An embodiment of the present invention provides a three-dimensional printing apparatus 400, which includes a light source device 200, a curing platform 300, and any one of the liquid tanks of the aforementioned embodiments. It is to be understood that the liquid tank 100 in FIG. 6 is identical to the liquid tank 100 illustrated in FIG. 1. The liquid tank 100 is configured to accommodate the photosensitive liquid 10; the light source device 200 is disposed below the liquid tank 100 for providing an curing light beam I that passes through the plate 130 and irradiates the workpiece curing area R. The light source device 200 may be, but is not limited to, a digital light processing (DLP) projection device or other types of projection device. The curing platform 300 and the plate 130 are disposed on two opposite sides of the release layer 110 of the liquid tank 100. The curing platform 300 is configured to move toward and away from the release layer 200.

Upon irradiation of the photosensitive liquid 10, the workpiece 20 is formed in the workpiece curing area R and attached to the platform 300. The platform 300 moves away from the release layer 110 so that the workpiece 20 is lifted upward and separates from the release layer 110. During the separation, presence of the fluid passage 133 would eliminate the low-pressure vacuum built between the release layer 110 and the plate 130 and balance the pressure along the two sides of the release layer 110. Consequently, the workpiece 20 may be easily separated from the release layer 110 by applying an uplift force that is greater than only the adhesive force between the workpiece 20 and the release layer 110, allowing the photosensitive liquid 10 to fill between the workpiece 20 and the release layer 110 so as to initiate the following printings.

An embodiment of the present invention provides a three-dimensional printing method for eliminating a low-pressure vacuum area built between the release layer and the plate for supporting the release layer during printing. The method includes gradually directing a fluid to flow from a portion of the low-pressure vacuum area to fill the entire low-pressure vacuum area. More specifically, the fluid passage 133 as illustrated in FIG. 2A may be adopted to direct the fluid F to flow from the portion of the low-pressure vacuum area connecting to the fluid passage 133 to gradually fill the entire low-pressure vacuum area. Additionally or alternatively, at least one lifting device 150 may be disposed adjacent to the plate 130c to lift the release layer 112 by propping against the surface 112 of the release layer 110, so as to direct the fluid F to flow from the edge of the low-pressure vacuum area to gradually fill the entire low-pressure vacuum area.

The aforementioned embodiments utilize the fluid passage(s) or the lifting device(s) to eliminate the low-pressure vacuum built between the release layer and the plate, therefore effectively reducing the uplift force required to release workpieces and avoiding workpiece damages and release layer deformation, as well as improving the speed and stability of three-dimensional printing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional printing apparatus, comprising:
   a liquid tank, having an opening, the liquid tank is capable of accommodating a photosensitive liquid, the liquid tank comprising:
   a release layer, capable of covering the whole opening, the release layer having a workpiece curing area, wherein the release layer is a flexible film; and
   a plate, for supporting the release layer and having a first area corresponding to the workpiece curing area and a second area adjacent to the first area, wherein the second area surrounds the first area, the plate is a light transmissive plate, the second area has at least one fluid passage extending from a first surface of the plate contacting the release layer to a second surface of the plate, an area of the opening is larger than an area of the plate, and the plate is isolated from the photosensitive liquid by the release layer;
   a light source device, disposed below the liquid tank, for providing a curing light beam passing through the plate and irradiating the workpiece curing area; and
   a curing platform, disposed on a first side of the release layer of the liquid tank, with the plate disposed on a second side of the release layer of the liquid tank opposite to the first side, wherein the curing platform is capable of moving toward and away from the release layer.

2. The three-dimensional printing apparatus according to claim 1, wherein the light source device is a light valve.

3. The three-dimensional printing apparatus according to claim 1, wherein the liquid tank further comprises: a fluid driver, connecting to the at least one fluid passage, for driving a fluid to flow through the at least one fluid passage.

4. The three-dimensional printing apparatus according to claim 3, wherein the fluid is gas or liquid.

5. The three-dimensional printing apparatus according to claim 1, wherein the at least one fluid passage linearly extends from the first surface of the plate to the second surface of the plate.

6. The three-dimensional printing apparatus according to claim 1, wherein the at least one fluid passage non-linearly extends from the first surface of the plate to the second surface of the plate.

7. The three-dimensional printing apparatus according to claim 1, wherein the liquid tank further comprises at least one lifting device disposed adjacent to the plate, the at least one lifting device comprises a mechanical part, and the mechanical part is configured to prop against a surface of the release layer, the at least one lifting device is configured for lifting the release layer so as to separate at least a portion of the release layer from the plate, wherein the lifting device is capable of moving with the release layer in a lifting process of the release layer.

8. The three-dimensional printing apparatus according to claim 7, wherein the at least one lifting device is a plurality of lifting devices, and the plurality of lifting devices are disposed symmetrically or encirclingly around the plate.

9. The three-dimensional printing apparatus according to claim 7, wherein the lifting device is capable of contacting with the release layer in the lifting process.

10. A three-dimensional printing apparatus, comprising:
    a liquid tank, for accommodating a photosensitive liquid, the liquid tank comprising:
    a release layer, having a workpiece curing area;
    a plate, for supporting a surface of the release layer, wherein the plate is isolated from the photosensitive liquid by the release layer; and
    at least one lifting device, disposed adjacent to the plate and propping against the surface of the release layer, the at least one lifting device is configured for lifting the release layer so as to separate at least a portion of the release layer from the plate.

11. The three-dimensional printing apparatus according to claim 10, further comprising:
    a light source device, disposed below the liquid tank, for providing a curing light beam passing through the plate and irradiating the workpiece curing area; and
    a curing platform, disposed on a first side of the release layer of the liquid tank, with the plate disposed on a second side of the release layer of the liquid tank opposite to the first side, wherein the curing platform is configured to move toward and away from the release layer.

12. The three-dimensional printing apparatus according to claim 10, wherein the at least one lifting device is a plurality of lifting devices, and the plurality of lifting devices are disposed symmetrically or encirclingly around the plate.

13. The three-dimensional printing apparatus according to claim 10, wherein the release layer is comprised of silicone or polytetrafluoroethylene.

14. The three-dimensional printing apparatus according to claim 10, wherein the plate is a light transmissive plate.

15. The three-dimensional printing apparatus according to claim 11, wherein the light source device is a projection device.

16. The three-dimensional printing apparatus according to claim 10, wherein the lifting device is capable of moving with the release layer in the lifting process of the release layer.

17. The three-dimensional printing apparatus according to claim 1, wherein the liquid tank further comprises a plurality of side walls surrounding the release layer, and a contact point of the release layer and the side walls is disposed lower than a contact point of the release layer and the plate.

18. A three-dimensional printing apparatus, comprising:
- a liquid tank, for accommodating a photosensitive liquid, the liquid tank comprising:
- a release layer, having a workpiece curing area, wherein the release layer is a flexible film, wherein the release layer comprises an intermediate zone and a peripheral zone surrounding the intermediate zone; and
- a plate, for supporting the release layer and having a first area corresponding to the workpiece curing area and a second area adjacent to the first area, wherein the second area surrounds the first area, the plate is a light transmissive plate, the second area has at least one fluid passage extending from a first surface of the plate contacting the release layer to a second surface of the plate, and the plate is isolated from the photosensitive liquid by the release layer, wherein the plate contacts with the release layer via only the intermediate zone of the release layer;
- a light source device, disposed below the liquid tank, for providing a curing light beam passing through the plate and irradiating the workpiece curing area; and
- a curing platform, disposed on a first side of the release layer of the liquid tank, with the plate disposed on a second side of the release layer of the liquid tank opposite to the first side, wherein the curing platform is capable of moving toward and away from the release layer.

* * * * *